(12) United States Patent
Shareef

(10) Patent No.: US 6,912,792 B1
(45) Date of Patent: Jul. 5, 2005

(54) APPARATUS FOR DETERMINING A LEVEL SURFACE

(76) Inventor: Uthman T. Shareef, 5531 Plum Ct., College Park, GA (US) 30349

( * ) Notice: Subject to any disclaimer, the term of this patent is extended or adjusted under 35 U.S.C. 154(b) by 0 days.

(21) Appl. No.: 10/699,192

(22) Filed: Nov. 3, 2003

(51) Int. Cl.⁷ .................................................. G01C 9/00
(52) U.S. Cl. .............................. 33/285; 33/286; 33/227; 33/451
(58) Field of Search .......................... 33/285, 286, 227, 33/263, 276, 278, 333, 374, 375, 383, 384, DIG. 21, 390, 451

(56) References Cited

U.S. PATENT DOCUMENTS

| | | | |
|---|---|---|---|
| 2,877,555 A | | 3/1959 | Visockis, Jr. |
| 3,815,250 A | | 6/1974 | Roodvoets et al. |
| 3,824,666 A | | 7/1974 | Roodvoets et al. |
| 3,897,637 A | * | 8/1975 | Genho .......................... 33/227 |
| 4,031,629 A | | 6/1977 | Paluck |
| 4,417,816 A | * | 11/1983 | Kindl et al. ................. 356/487 |
| 5,394,616 A | | 3/1995 | Claxton |
| 5,531,031 A | | 7/1996 | Green |
| 5,568,265 A | | 10/1996 | Mathews |
| 5,782,003 A | * | 7/1998 | Bozzo .......................... 33/291 |
| D409,508 S | | 5/1999 | Gallagher |
| 6,009,630 A | * | 1/2000 | Rando .......................... 33/365 |
| 6,202,312 B1 | * | 3/2001 | Rando .......................... 33/227 |
| 6,427,348 B1 | * | 8/2002 | Webb ........................... 33/286 |

* cited by examiner

Primary Examiner—Christopher W. Fulton
Assistant Examiner—Tania Courson

(57) ABSTRACT

An apparatus for determining a level surface includes a housing having a plurality of apertures and a power supply source disposed therein. A plurality of laser beam supply sources are operably controlled by the plurality of switches. A plurality of reflecting members spaced from the plurality of laser beam supply sources and receive a plurality of laser beams having respective first paths and reflect same away in corresponding second paths. A plurality of angle-adjusting members receive the plurality of laser beams and direct same along a third path and out of the housing via the plurality of apertures, respectively. A plurality of control dials are operably connected to the plurality of angle-adjusting members for positioning same to thereby establish the respective third angles of the plurality of laser beams. A plurality of leveling devices are attached to the housing and help position the apparatus at a substantially level position.

16 Claims, 4 Drawing Sheets

APPARATUS FOR DETERMINING A LEVEL SURFACE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a leveling apparatus and, more particularly, to a leveling apparatus including means for adjusting a laser beam to a desired position.

2. Prior Art

Various prior art attempts have been made to use laser beam generators for positioning purposes. For example, conventional types of measuring or aligning devices have been equipped with laser beam generating means.

Such prior art attempts include U.S. Pat. No. 5,531,031 to Green, which discloses a device for leveling and squaring that includes a level body having a spirit vial or electronic inclinometer. A battery powered laser module assembly is rotatably mounted in one end of the level body for emitting a visible laser beam therefrom.

U.S. Pat. No. 4,031,629 to Paluck discloses an apparatus for establishing a reference plane or a line comprising a laser beam with means for rotating the beam to establish a plane. The device includes a bracket mechanism, which can be attached to the ceiling or a wall so as to support the laser mechanism so that it can be adjusted in a number of directions to allow its height and its angular relationship to be set to any desired values.

Another example is U.S. Pat. No. 5,568,265 to Matthews, which discloses a portable hand tool having the appearances of a flashlight and the capability of projecting a collimated, coherent or otherwise directed, highly focused and narrow light beam. The tool is provided with a multiply threaded end opposite the end of light emanation, swivel capability about its elongate axis and bubble-type level devices.

Unfortunately, such laser beam equipped prior art devices suffer from various disadvantages. For example, they typically require a relatively complicated, relatively expensive, multi-component adjustable positioning subassembly to be associated with the laser beam generator. In addition, they are relatively delicate so that even minor accidental rough handling by a user can damage them. Furthermore, they are not simple, compact, readily portable, and usable in different applications.

Accordingly, a need remains for a new, simple, compact, versatile positioning device, which incorporates a laser beam generator.

BRIEF SUMMARY OF THE INVENTION

In view of the foregoing background, it is therefore an object of the present invention to provide an apparatus for determining a level surface. These and other objects, features, and advantages of the invention are provided by an apparatus for determining a level surface including a housing having opposed end portions, an exterior surface and including a plurality of apertures formed therein. The plurality of apertures are spaced apart from each other and are formed at the opposed end portions.

The apparatus further includes a power supply source disposed within the housing and for supplying power to thereto. A plurality of switches are connected to the power supply source and selectively toggle the apparatus between on and off positions. A plurality of laser beam supply sources are disposed within the housing and are operably controlled by the plurality of switches between corresponding on and off positions.

The apparatus further includes a plurality of reflecting members disposed within the housing and spaced from the plurality of laser beam supply sources. The plurality of reflecting members receive a plurality of laser beams having respective first paths from the plurality of laser supply sources and reflect the plurality of laser beams away in corresponding second paths respectively. A plurality of angle-adjusting members are spaced from the plurality of reflecting members and disposed within the housing.

Such angle-adjusting members receive the plurality of laser beams from the plurality of reflecting members and direct same along a third path and out of the housing via the plurality of apertures respectively. The plurality of angle-adjusting members each may include a body and a rod disposed substantially medially therebeneath and for allowing the same to pivot thereabout. A plurality of cables for operably connecting the plurality of control dials to the plurality of angle-adjusting members so that same can be moved to a desired position.

The apparatus further includes a plurality of control dials operably connected to the plurality of angle-adjusting members for positioning same and to thereby establish the respective third angles of a plurality of laser beams. Such control dials extend outwardly from the housing and are rotatably positionable to a desired location. Advantageously, the third paths of the laser beams can be adjust to a desired angle, as needed by an operator.

A plurality of leveling devices attached to the exterior surface of the housing assist to maintain the apparatus at a substantially level position so that the third path can be fine-tune at a desired position. Such leveling devices may include a plurality of spirit levels disposed substantially perpendicular to each other for determining the surface level of a plurality of corresponding transverse planes, for example.

Advantageously, one of the plurality of laser supply sources emits a laser beam exiting from one of the plurality of apertures and has a unidirectional path substantially parallel to a third path of one of the remaining plurality of laser beams to thereby provide a reference path for same.

The apparatus may further include a plurality of support members spaced from each other and attached to the exterior surface of the housing. Such support members assist to maintain the apparatus at a stationary position. The apparatus may further include a hanging bracket attached to the housing for maintaining the apparatus suspended above ground.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art.

Figure 1:
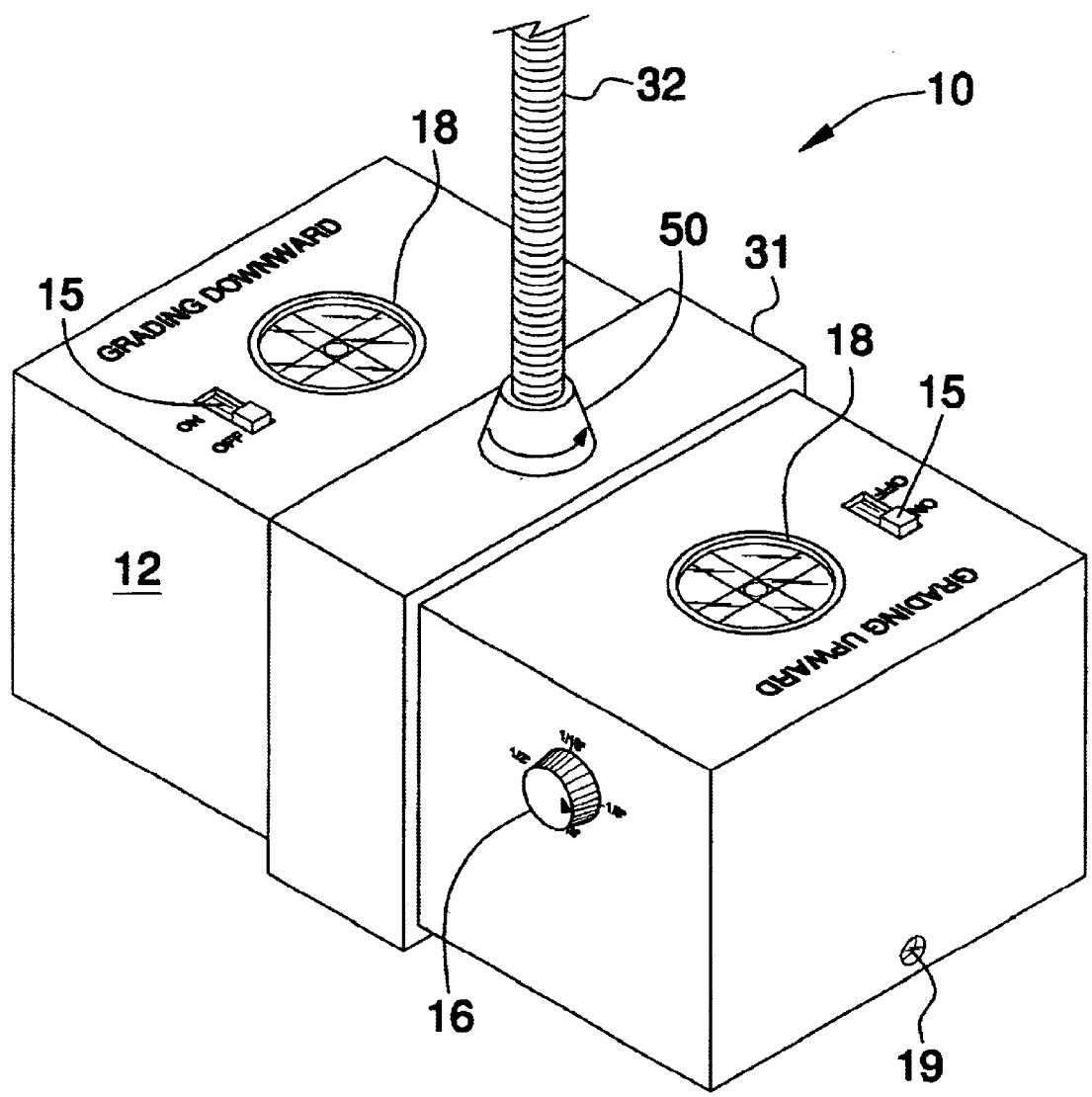
FIG. 1 is a perspective view showing an apparatus for determining a level surface, in accordance with the present invention.

The apparatus of this invention is referred to generally in FIG. 1 by reference numeral 10 and is intended to aid a plumber or related operator to determine a planar or level surface for establishing the correct slope of drain lines, trenches and related work. It should be understood that the apparatus 10 may have numerous applications and should not be limited to plumbing operations.

The apparatus 10 includes a housing 12 having substantially planar sidewalls preferably integral with each other and for forming a generally rectangular shape. Of course, the apparatus 10 may have a different shape as would be readily apparent to those skilled in the art. The housing 12 has an exterior surface, which is preferably provided with a plurality of support members 17. Such support members are spaced from each other and are preferably attached to the housing 12 at opposite corner portions via a conventional adhesive, as well known in the industry.

Switches 15 can be toggled between on and off positions for selectively operating the apparatus 10. Such switches 15 are preferably located in a readily accessible position on the exterior surface of housing 12 at the opposed end portions thereof (it is noted that a separate switch operates a laser beam for downward and upward gradings, respectively). Adjacent switches 15, leveling members 18 are disposed on housing 12. Such leveling members 17 preferably include a pair of spirit levels, as known to a person of ordinary skill in the art. The spirit levels overlap and are disposed in substantially perpendicular angles to one another. Such leveling devices 18 assist a user to maintain the apparatus 10 at a substantially horizontal or level position during operating conditions. It is noted that the present invention should be maintained at a substantially level position when being operated.

Figure 2:
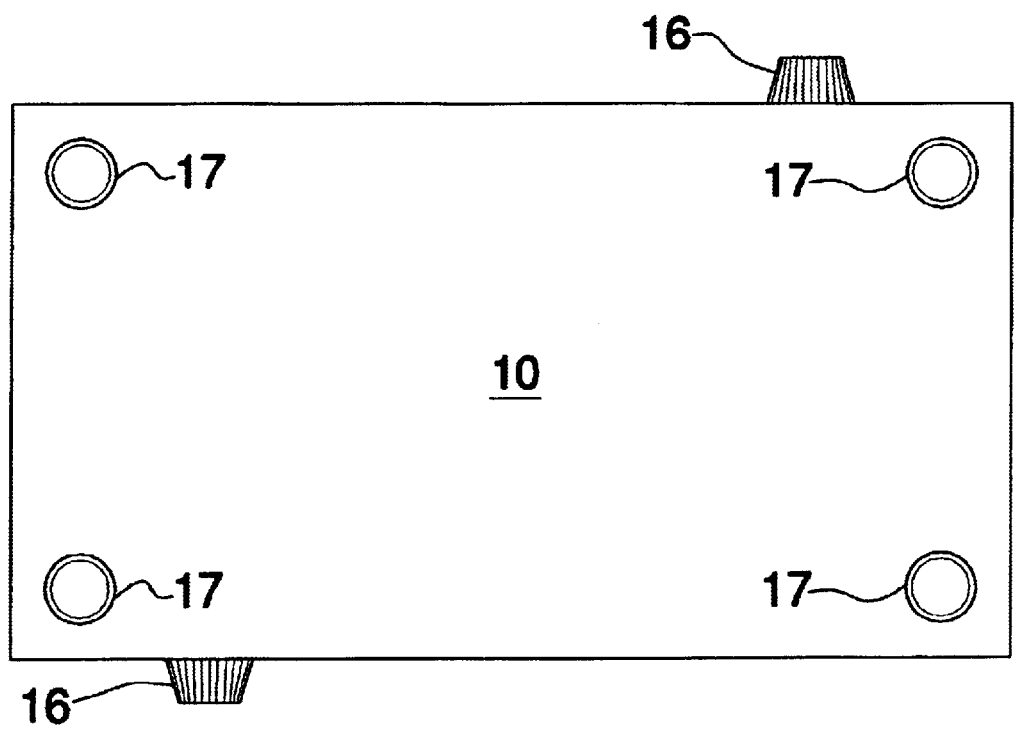
FIG. 2 is a bottom plan view thereof.
Figure 3:
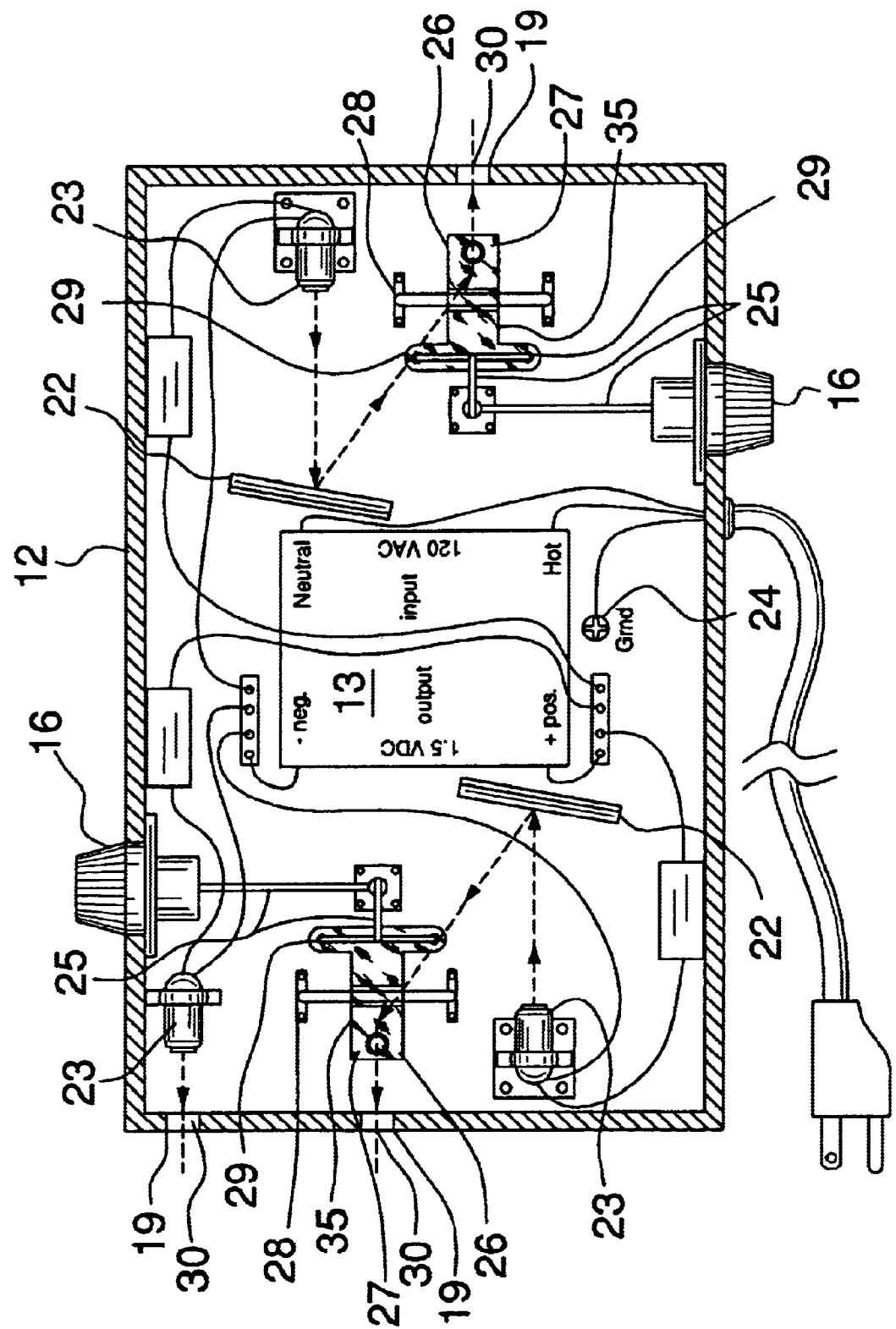
FIG. 3 is a cross-sectional view of the apparatus interior.

As perhaps best shown in FIGS. 2 and 3, a plurality of control dials 16 are connected to an exterior surface of housing 12 and extend outwardly therefrom. The control dials 16 are preferably disposed at opposite end portions of apparatus 10 and spaced apart from each other. Such control dials help adjust the angles of a plurality of laser beams 30 exiting the housing 12 via a plurality of apertures 19 by adjusting their associated third angles.

Now referring to FIG. 3 in more detail, the apparatus 10 is shown as including a hollow interior defined within housing 12. Notably, a power supply source 13 is disposed within such a housing 12 and is located generally medially therein so that a user may readily interchange batteries, for example, as needed. Of course, the power supply source 13 may also include a conventional 120-volt line. The power supply source 13 is electrically connected to switches 15 at one end thereof. A plurality of laser beam supply sources 23 are grounded to member 24 and are electrically connected to switches 15. Thus, as switches 15 are toggled between on and off positions, the power supply source 13 selectively supplies power to the laser beam supply sources 23. It is noted that the laser beam supply sources 23 preferably provides a solid-state laser beam, as readily known to a person of ordinary skill in the art. Of course, various conventional types of laser beams may be employed in the present invention, as well known in the industry.

The apparatus 10 further includes a plurality of reflecting members 22 spaced from the laser beam supply sources 23 and are intended to receive the plurality of laser beams 30 emitted therefrom. Such reflecting members 22 are preferably made from a suitable reflective material such as a conventional mirror, for example. The reflecting members 22 are preferably positioned at an angle so that when laser beams 30, having a first path, reach reflecting members 22, they will be reflected away therefrom at a corresponding second paths and towards a plurality of angle-adjusting members 26, as clearly shown.

Such angle-adjusting members 26 are preferably located below laser beam supply sources 23 wherein the laser beams 30 bounce off member 22 in a respective downward or upward sloping direction, which lead generally below or above laser beam supply sources 23, respectively. Angle-adjusting members 26 each include an elongate rod 28 secured within housing 12 and disposed beneath body 35 extending substantially transverse thereto. In particular, body 35 preferably has a generally T-shape and includes a groove formed at a bottom surface thereof for receiving rod 28 therealong. The angle-adjusting members 26 are therefore pivotable about a longitudinal access of rod 28. Control dials 16 are connected to an opposed end 29 of angle-adjusting members 26 via a plurality of substantially stiff cables 25. Such cables are preferably non-stretchable and sufficiently firm for causing end 29 of angle-adjusting members 26 to move in a substantially upward and downward motion corresponding to the annular rotation of control dial 16. Such connection between control dials 16 and angle-adjusting members 26 are preferably a conventional connection, as well known to a person of ordinary skill in the art.

The angle-adjusting members 26 are preferably made from a transparent material, such as glass, with sufficient properties to refract the laser beams 30 passing therethrough from a top surface to the bottom surface thereof. Advantageously, the angle-adjusting members 26 direct the laser beams 30 to a third path for exiting the housing 12 via apertures 19. To further assist in adjusting the position of angle-adjusting member 26, a preferably spiral spring 27 has one end portion connected to the bottom surface of member 26 and another end portion connected to housing 12. Such a spring 27 provides a resistive force for assisting to adjust the pivoted position of members 26 as control dials 16 are rotated. Moreover, one of the plurality of laser supply sources emits a laser beam exiting from one of the plurality of apertures and has a unidirectional path substantially parallel to the third path of remaining ones of the plurality of laser beams and for providing a reference path for same.

Figure 4:
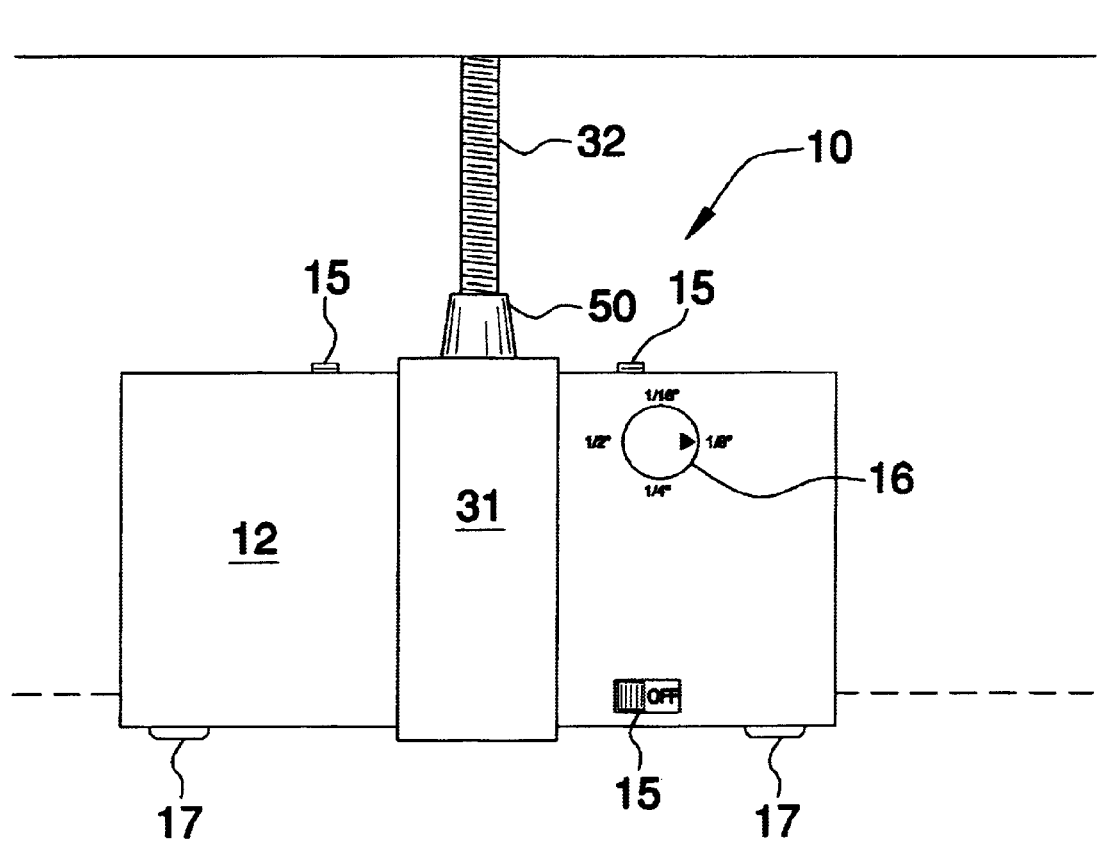
FIG. 4 is a side-elevational view showing the apparatus suspended from a ceiling via a hanging bracket.

Now referring to FIG. 4, apparatus 10 is shown as being connected to a ceiling 34 by a hanging bracket 31 including a threaded rod 32 attached thereto. Hanging bracket 31 may be selectively positioned along the rod 32 by rotating the swivel member 50 in either a clockwise or counterclockwise direction. Advantageously, the entire apparatus 10 does not need to be rotated about the rod 32 during adjustment thereof. Such a bracket 31 preferably receives apparatus 10 through its opening and is secured to the housing 12 via a conventional fastener 33 such as a nut and bolt, for example.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by letters patent of the United States is:

1. An apparatus for determining a level surface and comprising:
   a housing having opposed end portions and an exterior surface and including a plurality of apertures formed therein, said plurality of apertures being spaced apart from each other and being formed at said opposed end portions;
   a power supply source disposed within said housing and for supplying power to said apparatus;
   a plurality of switches connected to said power supply source and for selectively toggling said apparatus between on and off positions;
   a plurality of laser beam supply sources disposed within said housing and operably controlled by said plurality of switches and selectively operable between corresponding on and off positions;
   a plurality of reflecting members disposed within said housing and spaced from said plurality of laser beam supply sources, said plurality of reflecting members receiving a plurality of laser beams having respective first paths from said plurality of laser supply sources and reflecting said plurality of laser beams away in corresponding second paths respectively;
   a plurality of angle-adjusting members spaced from said plurality of reflecting members and disposed within said housing, said plurality of angle-adjusting members receiving a plurality of laser beams from said plurality of reflecting members and directing same along a third path and out of said housing via said plurality of apertures respectively;
   a plurality of control dials operably connected to said plurality of angle-adjusting members and for positioning same to thereby establish the respective third path of a plurality of laser beams; and
   a plurality of leveling devices attached to the exterior surface of said housing and for assisting to maintain said apparatus at a substantially level position.

2. The apparatus of claim 1, further comprising a plurality of support members spaced from each other and attached to the exterior surface of said housing, said plurality of support members for assisting to maintain said apparatus at a stationary position.

3. The apparatus of claim 1, wherein said plurality of leveling device comprise a plurality of spirit levels disposed substantially perpendicular to each other for determining the surface level of a plurality of corresponding transverse planes.

4. The apparatus of claim 1, wherein said plurality of control dials extend outwardly from said housing and are rotatably positionable to a desired location.

5. The apparatus of claim 1, wherein one said plurality of laser supply sources emits a laser beam exiting from one said plurality of apertures and has a unidirectional path substantially parallel to the third path of remaining ones of said plurality of laser beams and for providing a reference path for same.

6. The apparatus of claim 1, further comprising a plurality of cables for operably connecting said plurality of control dials to said plurality of angle-adjusting members so that same can be moved to a desired position.

7. The apparatus of claim 1, wherein said plurality of angle-adjusting members each comprises:
   a body and a rod disposed substantially medially therebeneath and for allowing said same to pivot thereabout.

8. The apparatus of claim 1, further comprising a hanging bracket attached to said housing and for maintaining said apparatus suspended above ground.

9. An apparatus for determining a level surface and comprising:
   a housing having opposed end portions and an exterior surface and including a plurality of apertures formed therein, said plurality of apertures being spaced apart from each other and being formed at said opposed end portions;
   a power supply source disposed within said housing and for supplying power to said apparatus;
   a plurality of switches connected to said power supply source and for selectively toggling said apparatus between on and off positions;
   a plurality of laser beam supply sources disposed within said housing and operably controlled by said plurality of switches and selectively operable between corresponding on and off positions;
   a plurality of reflecting members disposed within said housing and spaced from said plurality of laser beam supply sources, said plurality of reflecting members receiving a plurality of laser beams having respective first paths from said plurality of laser supply sources and reflecting said plurality of laser beams away in corresponding second paths respectively;
   a plurality of angle-adjusting members spaced from said plurality of reflecting members and disposed within said housing, said plurality of angle-adjusting members receiving a plurality of laser beams from said plurality of reflecting members and directing same along a third path and out of said housing via said plurality of apertures respectively;
   a plurality of control dials operably connected to said plurality of angle-adjustin members and for positioning same to thereby establish the respective third of a plurality of laser beams; and
   a plurality of leveling devices attached to the exterior surface of said housing and for assisting to maintain said apparatus at a substantially level position;
   one said plurality of laser supply sources emits a laser beam exiting from, one said plurality of apertures and has a unidirectional path substantially parallel to the third path of remaining ones of said plurality of laser beams and for providing a reference path for same.

10. The apparatus of claim 9, further comprising a plurality of support members spaced from each other and attached to the exterior surface of said housing, said plurality of support members for assisting to maintain said apparatus at a stationary position.

11. The apparatus of claim 9, wherein said plurality of leveling device comprise a plurality of spirit levels disposed substantially perpendicular to each other for determining the surface level of a plurality of corresponding transverse planes.

12. The apparatus of claim 9, wherein said plurality of control dials extend outwardly from said housing and are rotatably positionable to a desired location.

13. The apparatus of claim 9, further comprising a plurality of cables for operably connecting said plurality of control dials to said plurality of angle-adjusting members so that same can be moved to a desired position.

14. The apparatus of claim 9, wherein said plurality of angle-adjusting members each comprises:

a body and a rod disposed substantially medially therebeneath and for allowing said same to pivot thereabout.

15. The apparatus of claim 9, further comprising a hanging bracket attached to said housing and for maintaining said apparatus suspended above ground.

16. An apparatus for determining a level surface and comprising:

a housing having opposed end portions and an exterior surface and including a plurality of apertures formed therein, said plurality of apertures being spaced apart from each other and being formed at said opposed end portions;

a power supply source disposed within said housing and for supplying power to said apparatus;

a plurality of switches connected to said power supply source and for selectively toggling said apparatus between on and off positions;

a plurality of laser beam supply sources disposed within said housing and operably controlled by said plurality of switches and selectively operable between corresponding on and off positions;

a plurality of reflecting members disposed within said housing and spaced from said plurality of laser beam supply sources, said plurality of reflecting members receiving a plurality of laser beams having respective first paths from said plurality of laser supply sources and reflecting said plurality of laser beams away in corresponding second paths respectively;

a plurality of angle-adjusting members spaced from said plurality of reflecting members and disposed within said housing, said plurality of angle-adjusting members receiving a plurality of laser beams from said plurality of reflecting members and directing same along a third path and out of said housing via said plurality of apertures respectively, said plurality of angle-adjusting members each including a body and a rod disposed substantially medially therebeneath and for allowing said same to pivot thereabout;

a plurality of control dials operably connected to said plurality of angle-adjustig members and for positioning same to thereby establish the respective third path of a plurality of laser beams; and a plurality of leveling devices attached to the exterior surface of said housing and for assisting to maintain said apparatus at a substantially level position;

one said plurality of laser supply sources emits a laser beam exiting from one said plurality of apertures and has a unidirectional path substantially parallel to the third path of remaining ones of said plurality of laser beams and for providing a reference path for same.

\* \* \* \* \*